(12) United States Patent
Leppanen et al.

(10) Patent No.: US 12,190,439 B2
(45) Date of Patent: Jan. 7, 2025

(54) MEDIATED REALITY

(71) Applicant: Nokia Technologies Oy, Espoo (FI)

(72) Inventors: Jussi Leppanen, Tampere (FI); Miikka Vilermo, Siuro (FI); Francesco Cricri, Tampere (FI); Arto Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 273 days.

(21) Appl. No.: 17/787,761

(22) PCT Filed: Dec. 15, 2020

(86) PCT No.: PCT/EP2020/086165
§ 371 (c)(1),
(2) Date: Jun. 21, 2022

(87) PCT Pub. No.: WO2021/136652
PCT Pub. Date: Jul. 8, 2021

(65) Prior Publication Data
US 2023/0343022 A1 Oct. 26, 2023

(30) Foreign Application Priority Data
Dec. 31, 2019 (GB) ..................................... 1919440

(51) Int. Cl.
*G06T 15/20* (2011.01)
*A63F 13/5255* (2014.01)
(Continued)

(52) U.S. Cl.
CPC ............ *G06T 15/205* (2013.01); *G02B 27/01* (2013.01); *G06F 3/013* (2013.01); *G06F 3/017* (2013.01);
(Continued)

(58) Field of Classification Search
CPC ..... G06T 15/205; G06T 19/006; G02B 27/01; G02B 3/011; G02B 3/012; G02B 1/163;
(Continued)

(56) References Cited
U.S. PATENT DOCUMENTS

| 10,591,730 B2 | 3/2020 | Rodriguez, II |
| 2017/0221180 A1 | 8/2017 | Nakashima |

(Continued)

FOREIGN PATENT DOCUMENTS

| KR | 2013-0114314 | 10/2013 |

OTHER PUBLICATIONS

Peacocke, Margaree, et al., "An empirical comparison of first-person shooter information displays: HUDs, diegetic displays, and spatial representations", © 2018 Elsevier B.V., 18 pgs.

*Primary Examiner* — Said Broome
*Assistant Examiner* — Donna J. Ricks
(74) *Attorney, Agent, or Firm* — McCarter & English, LLP

(57) ABSTRACT

An apparatus including circuitry configured for: in a first-person perspective mediated reality state, rendering mediated reality content as content distributed across a first area of a user's field of view, wherein a point of view of a user determines a point of view within a three-dimensional virtual space and determines at least part of the content distributed across the first area of a user's field of view as a virtual scene; responding to at least one user gesture to enter a spatially consolidated state; and in the spatially consolidated state, rendering the mediated reality content as content distributed across a second area of a user's field of view, wherein the second area is smaller than the first area and the point of view of the user does not determine the content distributed across the second area of a user's field of view.

19 Claims, 7 Drawing Sheets

(51) Int. Cl.
*G02B 27/01* (2006.01)
*G06F 3/01* (2006.01)

(52) U.S. Cl.
CPC ... *A63F 13/5255* (2014.09); *A63F 2300/8082* (2013.01)

(58) Field of Classification Search
CPC .. G02B 1/16; G02B 3/01; G06F 3/013; G06F 3/017; A63F 13/5255; A63F 2300/8082; A63F 13/5378
See application file for complete search history.

(56) References Cited

U.S. PATENT DOCUMENTS

| | | | |
|---|---|---|---|
| 2018/0288354 A1* | 10/2018 | Anderson | G06T 11/60 |
| 2018/0300040 A1* | 10/2018 | Mate | G06F 3/013 |
| 2018/0348986 A1* | 12/2018 | Sawaki | G06F 3/0304 |
| 2019/0146219 A1* | 5/2019 | Rodriguez, II | G06F 21/36 |
| | | | 345/633 |
| 2022/0375176 A1* | 11/2022 | Benoliel | H04W 64/003 |

* cited by examiner

21

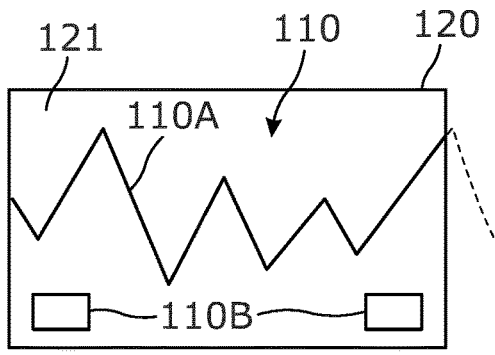 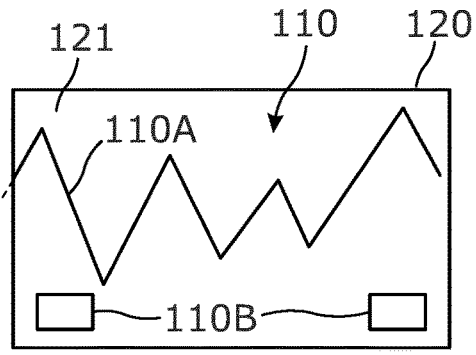
FIG. 9A                    FIG. 9B
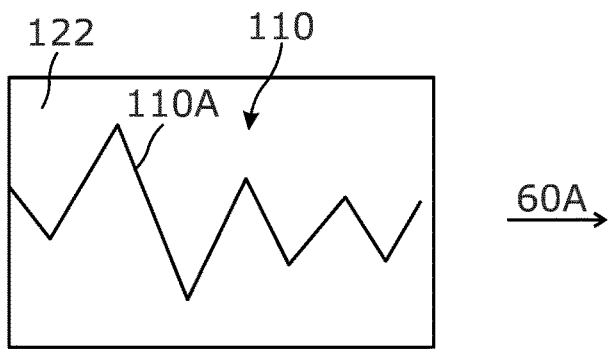 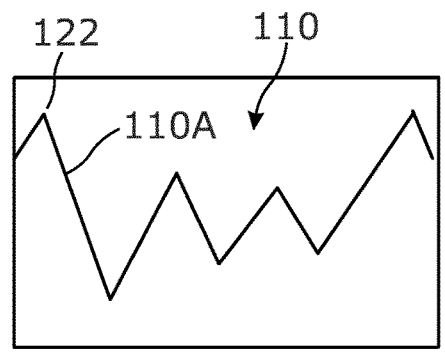
FIG. 10A                   FIG. 10B
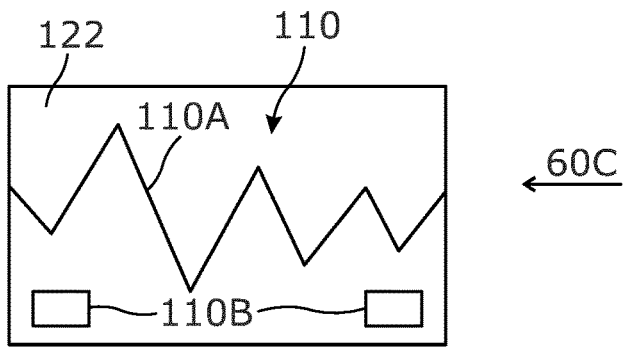 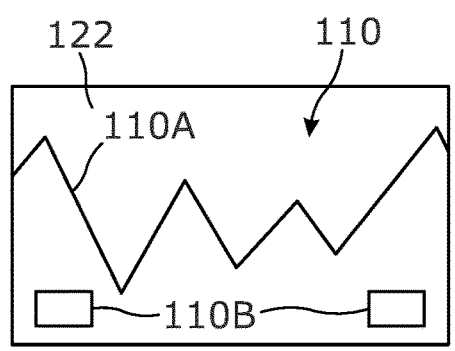
FIG. 10D                   FIG. 10C

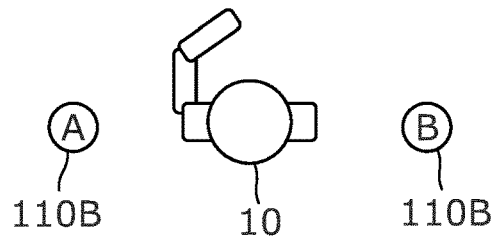
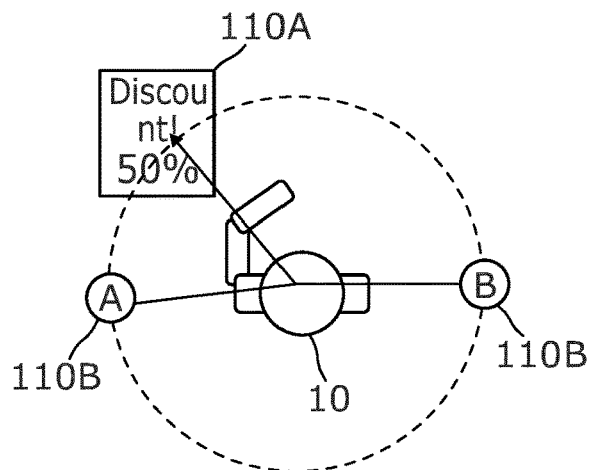
FIG. 12A
FIG. 12B
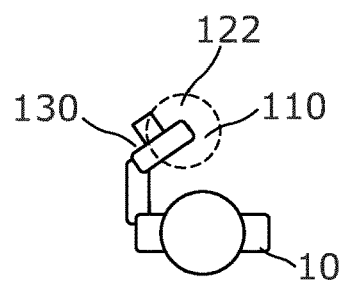
FIG. 12C

MEDIATED REALITY

CROSS REFERENCE TO RELATED APPLICATION

This patent application is a U.S. National Stage application of International Patent Application Number PCT/EP2020/086165 filed Dec. 15, 2020, which is hereby incorporated by reference in its entirety, and claims priority to GB 1919440.6 filed Dec. 31, 2019.

TECHNOLOGICAL FIELD

Embodiments of the present invention relate to mediated reality. In particular, embodiments of the present invention relate to first-person perspective mediated reality.

BACKGROUND

In first-person perspective mediated reality, a point of view of a user determines a point of view of a virtual user within a three-dimensional virtual space. The point of view of the virtual user determines the content displayed to the user.

The mediated reality is generally displayed via a head-mounted apparatus.

While the mediated reality provides an immersive experience, in some circumstances the content can be a distraction or an interference.

BRIEF SUMMARY

According to various, but not necessarily all, embodiments of the invention there is provided an apparatus comprising means for:
  in a first-person perspective mediated reality state, rendering mediated reality content as content distributed across a first area of a user's field of view, wherein a point of view of a user determines a point of view within a three-dimensional virtual space and determines at least part of the content distributed across the first area of a user's field of view as a virtual scene;
  responding to at least one user gesture to enter a spatially consolidated state; and
  in a spatially consolidated state, rendering the mediated reality content as content distributed across a second area of a user's field of view, wherein the second area is smaller than the first area and the point of view of the user does not determine the content distributed across the second area of a user's field of view.

In some but not necessarily all examples, the second area of a user's field of view is locked to a user's wrist and moves within the user's field of view as the user's wrist moves within the field of view.

In some but not necessarily all examples, the mediated reality content comprises a plurality of virtual objects and wherein locations of the plurality of virtual objects of the content in the second area are dependent upon a three-dimensional projection of the plurality of virtual objects in the virtual space onto a flat two-dimensional plane.

In some but not necessarily all examples, the locations of virtual objects of the content in the virtual space are projected onto the flat two-dimensional plane to determine the content distributed across the second area.

In some but not necessarily all examples, in the spatially consolidated state, at least one user action (e.g. gesture), but not the point of view of the user, determines a point of view within the three-dimensional virtual space and determines the content distributed across the second area of a user's field of view.

In some but not necessarily all examples, in the first-person perspective mediated reality state, a point of view determines a sub-set of world-locked content that is distributed across the first area of a user's field of view as a virtual scene but does not determine point-of-view-locked content rendered within the first area of a user's field of view,
  in the spatially consolidated state, an orientation of a user's wrist determines a sub-set of world-locked content that is distributed across the second area of a user's field but does not determine point-of-view-locked content rendered within the second area of a user's field of view.

In some but not necessarily all examples, in in the spatially consolidated state, the point-of-view-locked content is rendered within the second area of a user's field of view in response to a user gesture in relation to the wrist.

In some but not necessarily all examples, the defined user gesture or gestures comprises a movement of a user's hand in three-dimensions.

In some but not necessarily all examples, the defined user gesture or gestures is detected using a wrist worn device.

In some but not necessarily all examples, the defined user gesture or gestures selects one or more of:
  which content is spatially consolidated to the second area;
  which rendering device is used to render the second area; or
  one or more characteristics of the spatial consolidation to the second area selected from:
    size of the second area;
    location of the second area;
    shape of the second area.

In some but not necessarily all examples, the apparatus comprises means for:
  in the first-person perspective mediated reality state, rendering mediated reality content as content distributed across a first area of a user's field of view using a head-mounted display and
  in the spatially consolidated state, rendering mediated reality content as content distributed across a second area of a user's field of view, using the head-mounted display In some but not necessarily all examples, the second area of the user's field of view is presented as a simulated face of a wrist watch, the shape of the second area changing with a distance and an orientation of a user's wrist to eyes of the user.

In some but not necessarily all examples, the apparatus comprises means for:
  in the first-person perspective mediated reality state, rendering mediated reality content as content distributed across a first area of a user's field of view using a head-mounted display and
  in the spatially consolidated state, rendering mediated reality content as content distributed across a second area of a user's field of view, using a wrist worn device.

In some but not necessarily all examples, in the spatially consolidated state, mediated reality content is rendered as content distributed across a second area of a user's field of view, using a wrist worn device not the head-mounted display.

According to various, but not necessarily all, embodiments of the invention there is provided a method comprising:
- in a first-person perspective mediated reality state, rendering mediated reality content as content distributed across a first area of a user's field of view, wherein a point of view determines a point of view within a three-dimensional virtual space and determines at least part of the content distributed across the first area of a user's field of view as a virtual scene;
- detecting user gestures and responding to a defined user gesture or gestures to enter a spatially consolidated state; and
- in the spatially consolidated state, rendering mediated reality content as content distributed across a second area of a user's field of view, wherein the second area is smaller than the first area and
- the point of view of the user does not determine the content distributed across the second area of a user's field of view.

According to various, but not necessarily all, embodiments of the invention there is provided a computer program comprising instructions that when loaded into a processor cause:
- in a first-person perspective mediated reality state, rendering mediated reality content as content distributed across a first area of a user's field of view, wherein a point of view determines a point of view within a three-dimensional virtual space and determines at least part of the content distributed across the first area of a user's field of view as a virtual scene;
- detecting user gestures and responding to a defined user gesture or gestures to enter a spatially consolidated state; and
- in the spatially consolidated state, rendering mediated reality content as content distributed across a second area of a user's field of view, wherein the second area is smaller than the first area and
- the point of view of the user does not determine the content distributed across the second area of a user's field of view.

According to various, but not necessarily all, embodiments of the invention there is provided an apparatus comprising means for:
- in a first-person perspective mediated reality state, rendering mediated reality content as content distributed across a first area of a user's field of view, wherein a point of view of a user determines a point of view within a three-dimensional virtual space and determines at least part of the content distributed across the first area of a user's field of view as a virtual scene;
- responding to at least one user gesture to enter a new state; and
- in new state, rendering mediated reality content as content distributed across a second area of a user's field of view, wherein the second area is different to the first area.

In at least some examples, the point of view of the user does not determine the content distributed across the second area of a user's field of view.

In at least some examples, the new state is a spatially consolidated state. In the spatially consolidated state, rendering the mediated reality content as content distributed across a second area of a user's field of view, wherein the second area is smaller than the first area and the point of view of the user does not determine the content distributed across the second area of a user's field of view.

According to various, but not necessarily all, embodiments of the invention there is provided examples as claimed in the appended claims.

BRIEF DESCRIPTION OF FIGURES

For a better understanding of various examples that are useful for understanding the brief description, reference will now be made by way of example only to the accompanying drawings in which:

FIG. 9A, 9B show another example embodiment of the subject matter described herein;

FIG. 10A, 10B, 10C, 10D show another example embodiment of the subject matter described herein;

FIG. 12A, 12B, 12C show another example embodiment of the subject matter described herein.

DEFINITIONS

Figure 1A:
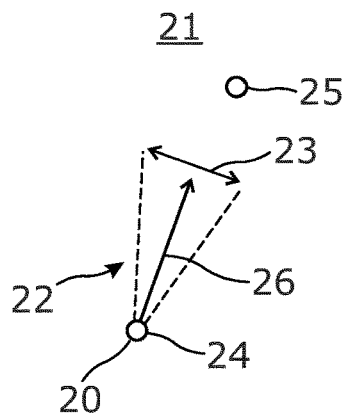
FIG. 1A shows an example embodiment of the subject matter described herein.

"artificial environment" may be something that has been recorded or generated.

"virtual visual space" refers to a fully or partially artificial environment that may be viewed, which may be three dimensional.

"virtual visual scene" refers to a representation of the virtual visual space viewed from a particular point of view (position) within the virtual visual space.

'virtual visual object' is a visible virtual object within a virtual visual scene. In some examples, the virtual visual space may extend horizontally up to 360° and may extend vertically up to 180°.

'virtual object' is an object within a virtual scene, it may be an augmented virtual object (e.g. a computer-generated virtual object) or it may be an image of a real object in a real space that is live or recorded. It may be a sound object and/or a virtual visual object.

"virtual position" is a position within a virtual space. It may be defined using a virtual location and/or a virtual orientation. It may be considered to be a movable 'point of view'.

"real space" (or "physical space") refers to a real environment, which may be three dimensional.

"real scene" refers to a representation of the real space from a particular point of view (position) within the real space.

"real visual scene" refers to a visual representation of the real space viewed from a particular real point of view (position) within the real space.

"mediated reality" in this document refers to a user experiencing, for example visually and/or aurally, a fully or partially artificial environment (a virtual space) as a virtual scene at least partially rendered by an apparatus to a user. The virtual scene is determined by a point of view (virtual position) within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more augmented virtual objects.

"mediated reality content" is virtual content which enables a user to experience, for example visually, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually and/or aurally, a partially artificial environment (a virtual space) as a virtual scene. Augmented reality content could include interactive content such as a video game or non-interactive content such as motion video.

"virtual reality content" is a form of mediated reality content which enables a user to experience, for example visually and/or aurally, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first person perspective-mediated" as applied to mediated reality, augmented reality or virtual reality means perspective mediated with the additional constraint that the user's real point of view (location and/or orientation) determines the point of view (virtual position) within the virtual space of a virtual user;

"third person perspective-mediated" as applied to mediated reality, augmented reality or virtual reality means perspective mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"virtual user" defines the point of view (virtual position-location and/or orientation) in virtual space used to generate a perspective-mediated sound scene and/or visual scene. A virtual user may be a notional viewer.

"notional viewer" defines the point of view (virtual position-location and/or orientation) in virtual space used to generate a perspective-mediated visual scene, irrespective of whether or not a user is actually viewing.

Three degrees of freedom (3DoF) describes mediated reality where the virtual position is determined by orientation only (e.g. the three degrees of three-dimensional orientation). An example of three degrees of three-dimensional orientation is pitch, roll and yaw. In relation to first person perspective-mediated reality 3DoF, only the user's orientation determines the virtual position.

Six degrees of freedom (6DoF) describes mediated reality where the virtual position is determined by both orientation (e.g. the three degrees of three-dimensional orientation) and location (e.g. the three degrees of three-dimensional location). An example of three degrees of three-dimensional orientation is pitch, roll and yaw. An example of three degrees of three-dimensional location is a three-dimensional coordinate in a Euclidian space spanned by orthogonal axes such as left-to-right (x), front to back (y) and down to up (z) axes. In relation to first person perspective-mediated reality 6DoF, both the user's orientation and the user's location in the real space determine the virtual position. In relation to third person perspective-mediated reality 6DoF, the user's location in the real space does not determine the virtual position. The user's orientation in the real space may or may not determine the virtual position. Three degrees of freedom plus' (3DoF+) describes an example of six degrees of freedom where a change in location (e.g. the three degrees of three-dimensional location) is a change in location relative to the user that can arise from a postural change of a user's head and/or body and does not involve a translation of the user through real space by, for example, walking.

DESCRIPTION

The FIGS. illustrate examples of an apparatus 30 comprising means for:
  in a first-person perspective mediated reality state 102, rendering mediated reality content as content 110 distributed across a first area 121 of a user's field of view 120, wherein a point of view 12 of a user 10 determines a point of view 22 within a three-dimensional virtual space 21 and determines at least part of the content 110 distributed across the first area 121 of the user's field of view 120 as a virtual scene;
  responding to at least one user gesture 80 to enter 101 a spatially consolidated state 104; and
  in a spatially consolidated state 104, rendering mediated reality content as content 110 distributed across a second area 122 of the user's field of view 120, wherein the second area 122 is smaller than the first area 121 and the point of view 12 of the user 10 does not determine the content 110 distributed across the second area 122 of the user's field of view 120.

Figure 1B:
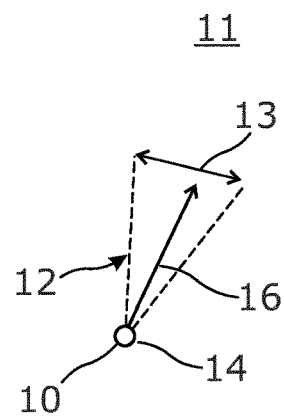
FIG. 1B shows another example embodiment of the subject matter described herein.

FIGS. 1A and 1B illustrate an example of rendering mediated reality content to a user using user-perspective mediated reality. In this example, mediated reality content is displayed to a user using user-perspective mediated reality.

Mediated reality content is virtual content which enables a user to experience, for example visually, a fully or partially artificial environment (a virtual space 21) as a virtual scene 23. Mediated reality content could include interactive content such as a video game or non-interactive content such as motion video. The virtual scene 23 is determined by a point of view (virtual position) 22 of a virtual user 20 within the virtual space 21. Displaying the virtual scene 23 means providing a virtual scene in a form that can be perceived by a user. Virtual scene 23 is a representation of the virtual space 21 viewed (or listened to) from a particular point of view (position) 22 of the virtual user 20 within the virtual space 21. The point of view (position) 22 of the virtual user 20 is defined by at least a direction (orientation) 26 of the virtual user 20 in the virtual space 21 and optionally a location 24 of the virtual user 20 in the virtual space 21.

The mediated reality content can, for example, be augmented reality content. Augmented reality content is a form of mediated reality content which enables a user to experience, for example visually, a partially artificial environment (a virtual space) as a virtual scene. Augmented reality content could include interactive content such as a video game or non-interactive content such as motion video.

The mediated reality content comprises virtual content that is additional to real content from a real scene, if any, that enables mediated reality by, for example, providing one or more virtual objects 25. The virtual object 25 can, for example, be a computer-generated virtual object. The mediated reality content is perspective-mediated because user actions determine the point of view (virtual position) 22 within the virtual space 21, changing the virtual scene 23.

In some examples, the mediated reality content is first person perspective-mediated because it is perspective mediated with the additional constraint that the point of view 12 (physical location 14 and/or real orientation 16) of the user 10 in the real space 11 determines the point of view (virtual position) 12 within the virtual space of a virtual user 20.

In some examples, the mediated reality content is third person perspective-mediated because the user's real point of view 12 in the real space 11 does not determine the point of view (virtual position) 22 within the virtual space 21.

The mediated reality may be user interactive-mediated. In this case, user actions at least partially determine what happens within the virtual space 21. This may enable interaction with a virtual object 25 such as a visual element within the virtual space 21. For example, a user may be able to select and move the virtual object 25

Figure 2:
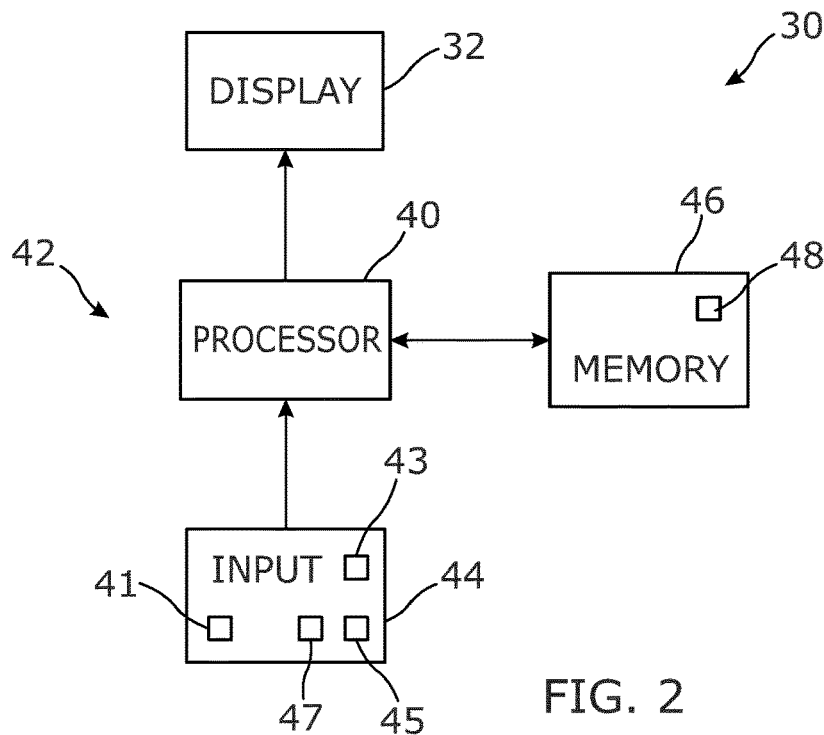
FIG. 2 shows another example embodiment of the subject matter described herein.

FIG. 2 illustrates an example of an apparatus 30 that is operable to enable mediated reality and/or augmented reality and/or virtual reality.

The apparatus 30 comprises a rendering device or devices 32, which may render information to a user visually via display, aurally via audio output and/or haptically via a haptic device. For the purposes of this example, the rendering device(s) will be described as a display.

The display 32 is for providing at least parts of the virtual scene 23 to a user in a form that is perceived visually by the user. The display 32 may be a visual display that provides light that displays at least parts of the virtual scene 23 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 2 the controller 42 may comprise a processor 40 configured to load computer program 48 from a memory 46. The controller 42 may be implemented using instructions that enable hardware functionality, for example, by using executable computer program 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores at least a computer program 48 comprising computer program instructions (computer program code) that controls the operation of the apparatus 30 when loaded into the processor 40. The computer program instructions, of the computer program 48, provide the logic and routines that enables the apparatus to perform at least the methods described herein. The processor 40 by reading the memory 46 is able to load and execute the computer program 48.

The user input circuitry 44 detects user actions using user input 43. These user actions are processed by the controller 42.

The apparatus 30 may enable perspective mediation for mediated reality and/or augmented reality and/or virtual reality. The user input circuitry 44 detects user actions. These user actions are used by the controller 42 to determine the point of view 22 within the virtual space 21, changing the virtual scene 23. The point of view 22 may be continuously variable in position and/or direction and user action changes the position and/or direction of the point of view 22. Alternatively, the point of view 22 may have discrete quantised positions and/or discrete quantised directions and user action switches the position and/or direction of the point of view 22 by jumping to the next position and/or direction of the point of view 22.

The apparatus 30 can enable first person perspective for mediated reality, augmented reality or virtual reality. The user input circuitry 44 detects the user's real point of view 12 using user point of view sensor 45. The user's real point of view is used by the controller 42 to determine the corresponding point of view 22 within the virtual space 21, changing the virtual scene 23. Referring back to FIG. 1B, a user 10 has a real point of view 12. The real point of view 12 may be changed by the user 10. For example, a physical location 14 of the real point of view 12 is the location of the user 10 and can be changed by changing the physical location 14 of the user 10. For example, a real direction 16 of the real point of view 12 is the direction in which the user 10 is looking and can be changed by changing the real direction 16 of the user 10. The real direction 16 may, for example, be changed by a user 10 changing an orientation of their head or view point and/or a user changing a direction of their gaze. A head-mounted apparatus 30 may be used to enable first-person perspective mediation by measuring a change in orientation of the user's head and/or a change in the user's direction of gaze.

The apparatus 30 comprises as part of the user input circuitry 44 user point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 14 of the user 10 and real point of view 12.

For example, accelerometers, electronic gyroscopes or electronic compasses may be used to determine a change in an orientation of a user's head or view point and a consequential change in the real direction 16 of the real point of view 12.

For example, pupil tracking technology, based for example on computer vision, may be used to track movement of a user's eye or eyes and therefore determine a direction of a user's gaze and consequential changes in the real direction 16 of the real point of view 12.

The apparatus 30 may comprise as part of the user input circuitry 44 image sensors 47 for imaging the real space 11.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 11 is viewed from different perspectives. This may enable the creation of a three-dimensional image and/or processing to establish depth, for example, via the parallax effect.

In some but not necessarily all embodiments, the user input circuitry 44 may comprise communication circuitry 41.

Figures 3A, 3B, 4:
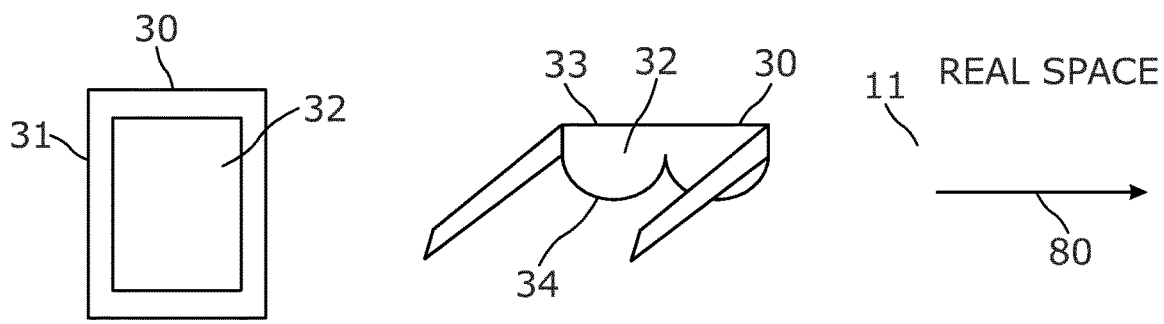
FIG. 3A shows another example embodiment of the subject matter described herein.
FIG. 3B shows another example embodiment of the subject matter described herein.
FIG. 4 shows another example embodiment of the subject matter described herein.

FIGS. 3A and 3B illustrate examples of apparatus 30 that enable display of at least parts of the virtual visual scene 23 to a user and, optionally, rendering of audio to a user.

FIG. 3A illustrates a hand-portable apparatus 31 comprising a display screen as display 32 that defines a viewport for displaying images to a user. The viewport is used for displaying the virtual visual scene 23 to the user. The viewport defines the field of view and can have an area that is equal to or smaller than the area of the display 32.

The hand-portable apparatus 31 may be moved deliberately with a hand of a user in one or more of six degrees of freedom (three for location and three for direction).

The hand-portable apparatus 31 may house the user point of view sensors 45 for determining changes in orientation and/or location of the apparatus 30.

The hand-portable apparatus 31 may house one or more user controlled devices such as, for example, buttons, virtual buttons, slider, joystick, etc.

FIG. 3B illustrates a head-mounted apparatus 33 comprising a display 32 that displays images to a user. The head-mounted apparatus 33 may be moved automatically when a head of the user moves. The head-mounted apparatus 33 may house the user point of view sensors 45 for gaze direction detection and/or selection gesture detection.

The head-mounted apparatus 33 may be a see-through arrangement for augmented reality that enables a live real visual scene 13 to be viewed while one or more virtual object 25 are displayed by the display 32 to the user to provide in combination the virtual scene 23. In this case a visor 34, if present, is transparent or semi-transparent so that the live real visual scene can be viewed through the visor 34 within a viewport.

The head-mounted apparatus 33 may be operated as a see-video arrangement for augmented reality that enables a live or recorded video of a real visual scene to be displayed by the display 32 for viewing by the user while one or more virtual objects 25 are simultaneously displayed by the display 32 for viewing by the user. The combination of the displayed real visual scene 13 and displayed one or more virtual objects 25 provides the virtual scene 23 to the user. In this case a visor 34 is opaque and may be used as display 32.

Other examples of apparatus 30 that enable display of at least parts of the virtual visual scene 23 to a user may be used.

The user input circuitry 44 detects user actions using user input 43. These user actions are used by the controller 42 to determine what happens within the virtual space 21. This may enable interaction with a virtual object 25 within the virtual space 21.

The detected user actions may, for example, be gestures performed in the real space 11. Gestures may be detected in a number of ways. For example, depth sensors may be used to detect movement of parts of a user 10 and/or or image sensors 47 may be used to detect movement of parts of a user 10 and/or positional/movement sensors attached to a limb of a user 10 may be used to detect movement of the limb. For example, a wrist-worn device, such as a smart watch, can be used to detect gestures.

Object tracking may be used to determine when an object or user changes. For example, tracking the object on a large macro-scale allows a frame of reference that moves with the object to be created. That frame of reference can then be used to track time-evolving changes of shape of the object, by using temporal differencing with respect to the object. This can be used to detect small scale human motion such as gestures, hand movement, finger movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in action recognition.

Referring to FIG. 4, a particular action 80 in the real space 11 is an action user input used as a 'user control' event by the controller 42 to determine what happens within the virtual space 21. An action user input is an action 80 that has meaning to the apparatus 30 as a user input.

An action 80 may be static or moving. A moving action may comprise a movement or a movement pattern comprising a series of movements. For example, a moving action could be a circling motion, a side to side or up and down motion, or the tracing of a sign in space. A moving action may, for example, be an apparatus-independent action or an apparatus-dependent action. A moving action may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

An action 80 may be a non-contact action. A non-contact action does not contact the sensors at any time during the action.

An action 80 may be an absolute action that is defined in terms of an absolute displacement from the sensors. Such an action may be tethered, in that it is performed at a precise location in the real space 11. Alternatively, an action 80 may be a relative action that is defined in terms of relative displacement during the action. Such an action may be un-tethered, in that it need not be performed at a precise location in the real space 11 and may be performed at a large number of arbitrary locations.

An action 80 may be defined as evolution of the displacement of a tracked point, relative to an origin, with time. It may, for example, be defined in terms of motion using time variable parameters such as displacement, velocity or using other kinematic parameters. An un-tethered action may be defined as evolution of relative displacement Δd with relative time Δt.

An action 80 may be performed in one spatial dimension (1D action), two spatial dimensions (2D action) or three spatial dimensions (3D action).

The action 80 may be a gesture. The gesture can, for example, be a movement of a hand of a user 10 in three-dimensions.

Figure 5:
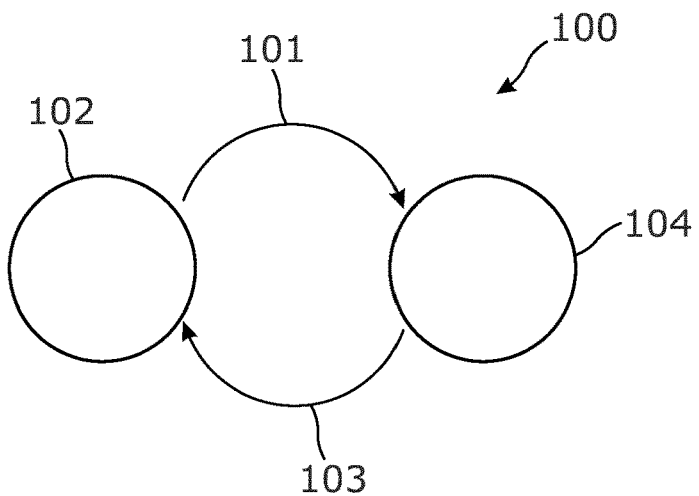
FIG. 5 shows another example embodiment of the subject matter described herein.

The apparatus 30 can operate in accordance with the state machine 100 illustrated in FIG. 5.

The state machine 100 comprises a first-person perspective mediated reality state 102 and a spatially consolidated state 104. The state machine 100 can transition 101 from the first-person perspective mediated reality state 102 to the spatially consolidated state 104. The state machine 100 can transition 103 from the spatially consolidated state 104 to the first-person perspective mediated reality state 102.

The transition 101 can, for example, be in response to a gesture 80 by the user 10.

The transition 103 can, for example, be in response to a gesture 80 by the user 10.

Figure 6A:
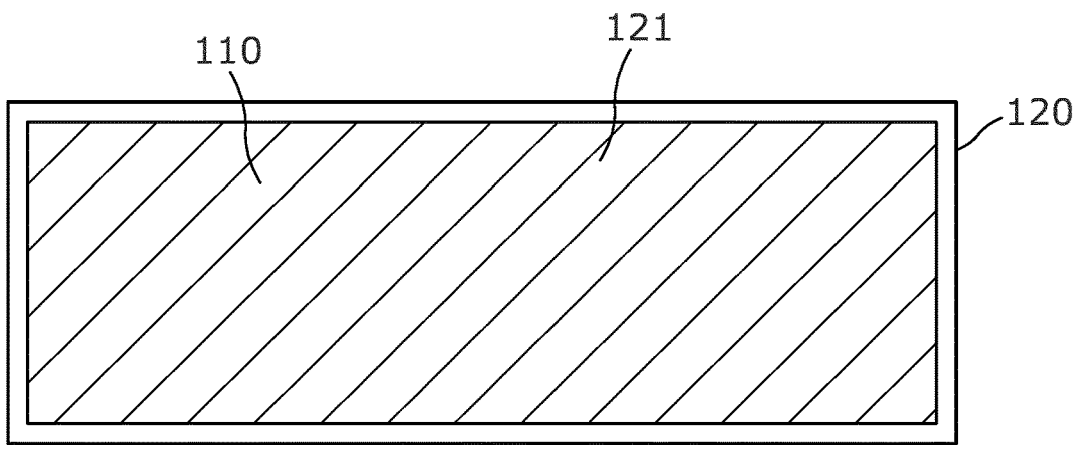
FIG. 6A shows another example embodiment of the subject matter described herein.

As illustrated in FIG. 6A, when in the first-person perspective mediated reality state 102, the apparatus 30 is configured to render mediated reality content as first-person perspective mediated reality content. The apparatus 30 is configured to render mediated reality content as content 110 distributed across a first area 121 of a user's field of view 120. A point of view 12 of a user 10 determines a point of view 22 within the three-dimensional virtual space 21 and determines at least part of the content 110 distributed across the first area 121 of a user's field of view 120 as a virtual scene.

Figure 6B:
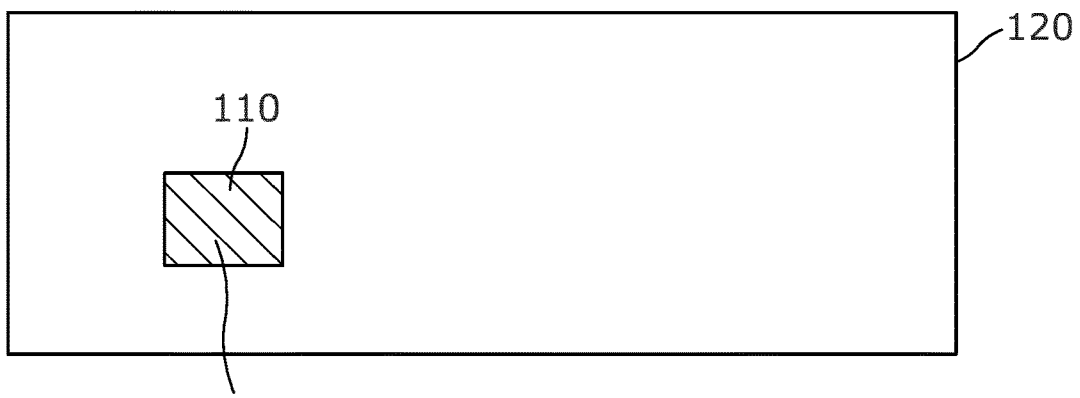
FIG. 6B shows another example embodiment of the subject matter described herein.

As illustrated in FIG. 6B, when in the spatially consolidated state 104, the apparatus 30 is configured to render mediated reality content but not as first-person perspective mediated reality content. The apparatus 30 can be configured to render mediated reality content as third-person perspective mediated reality content. The apparatus 30 is configured to render mediated reality content as content 110 distributed across a second area 122 of the user's field of view 120. The second area is smaller than the first area, consolidating the content to a smaller area. A point of view 12 of a user 10 does not determine a point of view 22 within the three-dimensional virtual space 21.

The apparatus 30 therefore comprises means for:

in a first-person perspective mediated reality state 102, rendering mediated reality content as content 110 distributed across a first area 121 of a user's field of view 120, wherein a point of view 12 of a user 10 determines a point of view 22 of a virtual user 20 within a three-dimensional virtual space 21 and determines at least part of the content 110 distributed across the first area 121 of a user's field of view 120 as a virtual scene 23;

responding to at least one user gesture 80 to enter a spatially consolidated state 104; and in a spatially consolidated state 104, rendering mediated reality content as content 110 distributed across a second area 122 of a user's field of view 120, wherein the second area 122 is smaller than the first area 121 and the point of view 12 of the user 10 does not determine the content 110 distributed across the second area 122 of the user's field of view 120.

The user by performing the gesture 80 can switch from first-person mediated reality (e.g. being 'inside' the content looking outwards, with a change in the user point of view 12 (head orientation) determining a change in visual scene) to third-person mediated reality (e.g. being 'outside' the content looking inwards with a change in the user point of view 12 not determining a change in visual scene) while also reducing the proportion of the user's field of view 120 used for displaying the content 110.

The user gesture 80 used to switch states can be a defined user gesture that is a gesture that has certain defined attributes that allow it to be disambiguated from other gestures.

Switching states keeps mediated reality content accessible without the user being fully immersed.

Figure 7A:
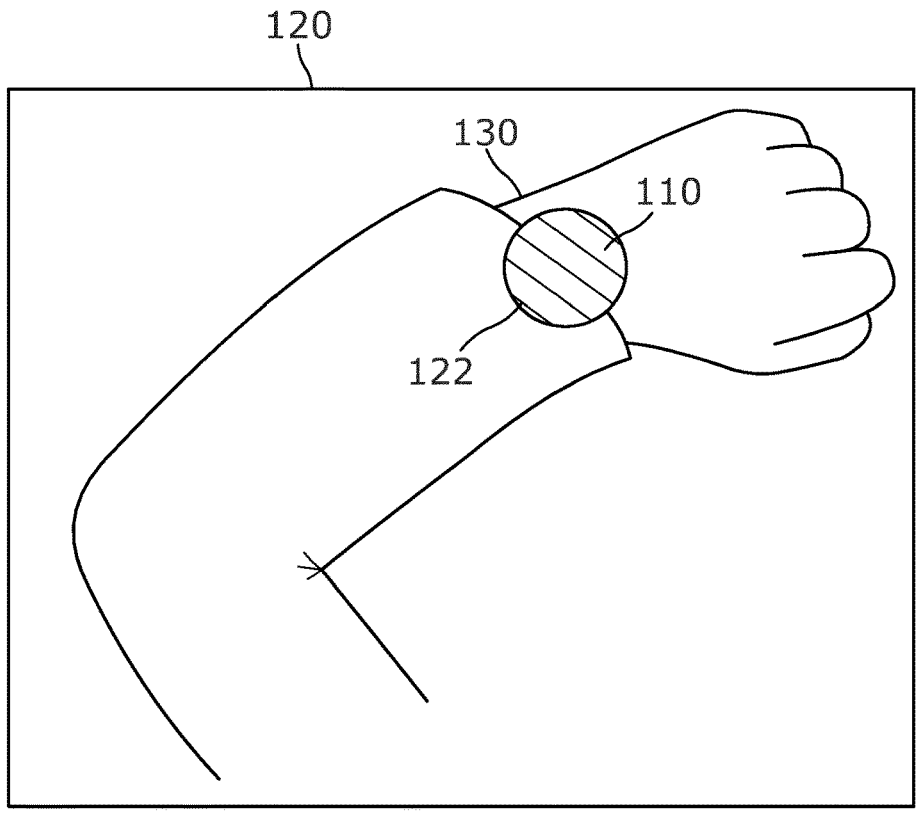
FIGS. 7A and 7B show another example embodiment of the subject matter described herein.
Figure 7B:
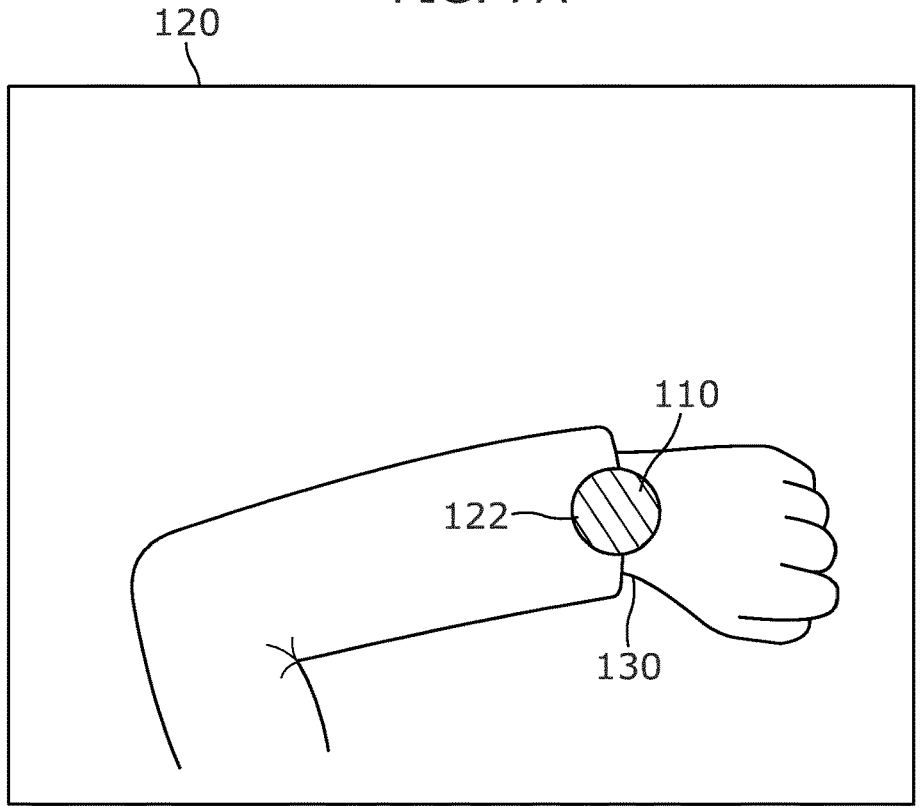

FIGS. 7A and 7B illustrate an example of a field of view 120 of the user 10, when the apparatus 30 is in the spatially consolidated state 104.

In this example, at least one user action, but not the point of view 12 of the user 10, determines a point of view 22 within the three-dimensional virtual space 21 and determines the content 110 distributed across the second area 122 of a user's field of view 120.

In this example, the second area 122 of a user's field of view 120 is coincident with a limb 130 of the user 10. In this example, the second area 122 of a user's field of view 120 is coincident with a wrist of user 10, at a position similar to that of a wrist watch. Any suitable limb 130 can be used. In the examples below the limb is a wrist 130 but another limb or part of the same limb or part of the user's body can be used.

FIGS. 7A and 7B illustrate a movement of the wrist 130 of the user 10. As the wrist 130 of the user 10 moves, the second area 122 of a user's field of view 120 also moves so that it remains coincident with the wrist 130 of the user 10. The second area 122 of a user's field of view 120 is locked to the user's wrist 130 and moves within the user's field of view 120 as the user's wrist 130 moves within the field of view 120.

In this example, the orientation of the wrist 130 of the user 10 (but not the point of view 12 of the user 10) is used to determine a point of view 22 within the three-dimensional virtual space 21 and determine the content 110 distributed across the second area 122 of a user's field of view 120.

The user gesture 80 that switches to the spatially consolidated state 104 or a further user gesture 80 can be used to select:

which content 110 is spatially consolidated to the second area 122; and/or which rendering device is used to render the second area 122; and/or one or more characteristics of the spatial consolidation to the second area.

The selected one or more characteristics of the spatial consolidation to the second area 122 can for example be: a size of the second area 122; and/or a location of the second area 122; and/or a shape of the second area 122.

In some but not necessarily all examples, the user gesture 80 that switches to the spatially consolidated state 104 or a further user gesture 80 can have an impact on the first-person perspective mediated reality state 102, when there is a transition 103 back from the spatially consolidated state 104 to the first-person perspective mediated reality state 102. It may, for example, control the point of view 22 after the transition 103. For example, in some but not necessarily all examples, in the spatially consolidated state 104 the mediated reality content 110 across the second area 122 can be modified by the user, for example using gestures 80. For example, the user can select which mediated reality content 110 to display and/or which mediated reality content not to display. The user can, for example, control how the mediated reality content 110 is distributed across the second area 122. When the state transition 103 back from the spatially consolidated state 104 to the first-person perspective mediated reality state 102 occurs, the choices made by the user, for example the redistribution of the mediated reality content 110, can affect the distribution of the mediated reality content 110 across the first area 121 or affect the point of view 22. In some but not necessarily all examples, the mediated reality content 110 that is foremost in the second area 122 when the transition 103 occurs is also foremost in the first area 121 in front of the user; the point of view 22 adjusting to accommodate this. The adjusted point of view 22 can have a direction 26 towards that mediated reality content 110.

As previously described, the apparatus 30 can use a head-mounted display. The apparatus comprises means for: in the first-person perspective mediated reality state 102, rendering mediated reality content as content 110 distributed across a first area 121 of a user's field of view 120 using a head-mounted apparatus 33 (e.g. a head-mounted display).

The apparatus can comprise means for: in the spatially consolidated state 104, rendering mediated reality content as content 110 distributed across a second area 122 of a user's field of view 120, using the head-mounted apparatus 33 (a head-mounted display). In some examples, the second area 122 of the user's field of view 120 is presented as a simulated face of a wrist watch, as illustrated in FIGS. 7A and 7B. The second area 122 of the user's field of view 120 is presented as a simulated face of a wrist watch and the shape of the second area 122 changes with a distance and an orientation of a user's wrist 130 to eyes of the user 10.

Alternatively or additionally, the apparatus can comprise means for: in the spatially consolidated state 104, rendering mediated reality content as content 110 distributed across a second area 122 of a user's field of view 120, using a wrist-mounted apparatus (i.e. a hand-portable apparatus 31). In some examples, the second area 122 of the user's field of view 120 is presented in a display of the wrist-mounted apparatus 31 (not a head-mounted apparatus 33).

The wrist-mounted apparatus 31 could for example be a smart watch. The mediated reality content 110 in the second area can therefore be shown to others. The movement of the user's wrist can vary the rendered content (by changing the point of view 22) and, notifications associated with the mediated reality content can be provided via the smart watch e.g. by vibrating.

Figure 8A:
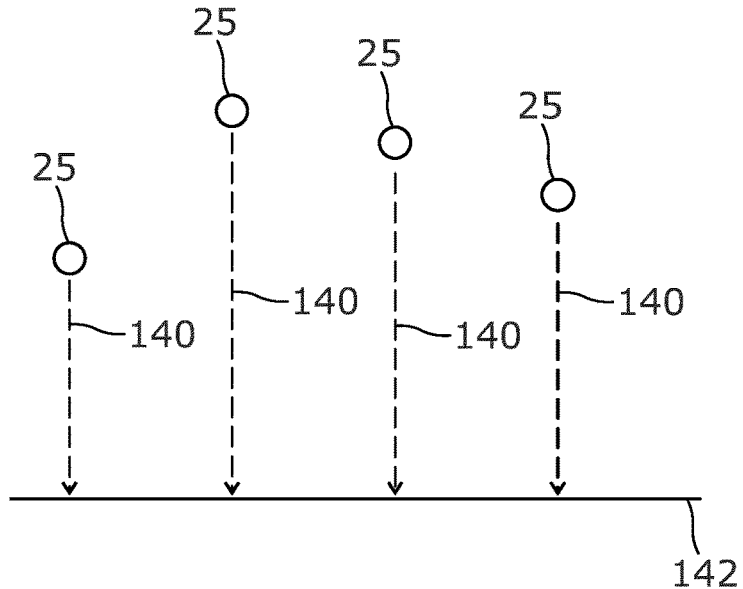
FIG. 8A, 8B, 8C show another example embodiment of the subject matter described herein.
Figure 8B:
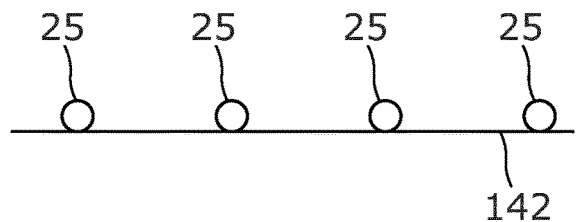
Figure 8C:
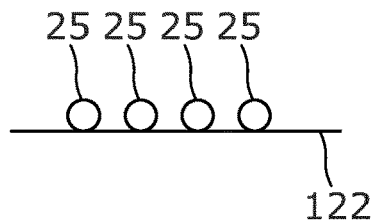

FIGS. 8A, 8B, 8C illustrate how a plurality of virtual objects 25 distributed with the three-dimensional virtual space are rendered as virtual objects within the two-dimensional second area 122 of the user's field of view 120.

A plurality of virtual objects 25, such as visual elements of the content 110 in the second area 122 are dependent upon a three-dimensional projection 140 of the plurality of virtual object 25 in the virtual space 21 onto a flat two-dimensional plane 142. The locations of all the virtual objects 25 of the content 110 in the virtual space 21 are projected onto the flat two-dimensional plane 142 (FIGS. 8A and 8B), then re-scaled by shrinking (compare FIGS. 8C and 8B), to determine the content 110 distributed across the second area 122 (FIG. 8C).

All or some of the virtual objects 25 in the virtual space can be projected onto the flat two-dimensional plane to determine the content 110 distributed across the second area 122.

FIG. 9A and FIG. 9B illustrate different types of content 110. In this example, the content 110 comprises world-locked content 110A and point-of-view-locked content 110B.

The apparatus 30 is configured to render mediated reality content as content 110 distributed across an area of a user's field of view 120. A point of view 22 within the three-dimensional virtual space 21 determines at least part of the content 110 distributed across the first area 121 of the user's field of view 120.

The apparatus 30, in the first-person perspective mediated reality state 102, is configured to render mediated reality content as content 110 distributed across a first area 121 of a user's field of view 120. A point of view 12 of a user 10 determines a point of view 22 of a virtual user 20 within the three-dimensional virtual space 21 and the point of view 22 determines at least part of the content 110 distributed across the first area 121 of the user's field of view 120.

The point of view 22 of the virtual user 20 is moved from left to right between FIGS. 9A and 9B.

By comparing FIGS. 9A to 9B, it can be seen that the world-locked content 110A tracks from right to left in the opposite direction to the point of view 22 of the virtual user 20.

By comparing FIGS. 9A to 9B, it can be seen that the point-of-view-locked content 110B is stationary in the field of view 120 and does not track from right to left in the opposite direction to the point of view 22 of the virtual user 20.

In the first-person perspective mediated reality state 102, a point of view 22 of the virtual user 20 determines a sub-set of world-locked content 110A that is distributed across the first area 121 of a user's field of view 120 as a virtual scene but does not determine point-of-view-locked content 110B rendered within the first area 121 of a user's field of view 120.

In the spatially consolidated state, an orientation of a user's wrist 130 can be used to determine a sub-set of world-locked content 110A that is distributed across the second area 122 of a user's field of view 120 but does not determine point-of-view-locked content 110B rendered within the second area 122 of a user's field of view 120.

The orientation of the wrist 130 is moved 60A from left to right between FIGS. 10A and 10B.

By comparing FIGS. 10A to 10B, it can be seen that the world-locked content 110A tracks from right to left in the opposite direction to the change in orientation of the user's wrist 130. There is no point-of-view-locked content 110B displayed.

In this example, the point-of-view-locked content 110B is rendered within the second area 122 of a user's field of view in response to a user gesture 60B in relation to the wrist 130 of the user 10 (FIG. 10C).

The orientation of the wrist 130 is moved 60C from right to left between FIGS. 10C and 10D.

By comparing FIGS. 10C to 10D, it can be seen that the world-locked content 110A tracks from left to right, through the second area 122 of the field of view, in the opposite direction to the change in orientation of the user's wrist 130. The point-of-view-locked content 110B is stationary in the field of view and does not tracks from left to right in the opposite direction to the change in orientation of the user's wrist 130.

Figure 11A:
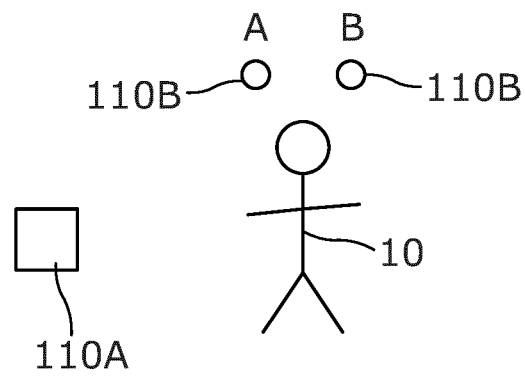
FIG. 11A, 11B, 11C, 11D show another example embodiment of the subject matter described herein.

FIG. 11A illustrates an example where a user 10 is using the apparatus 30. The apparatus 30 is in the first-person perspective mediated reality state 102.

The apparatus 30 renders world-locked content 110A to the user and renders point-of-view-locked content 110B to the user 10.

Figure 11B:
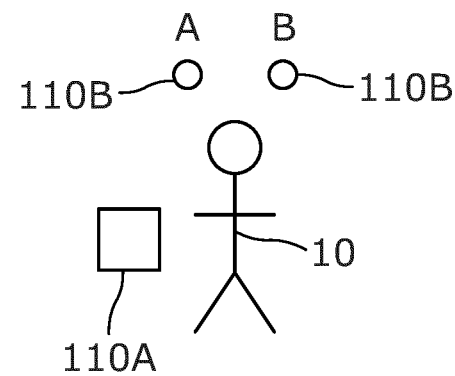
Figure 11C:
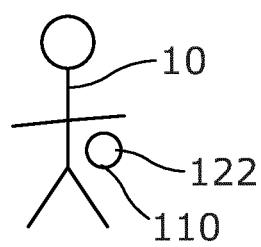

In FIG. 11B the user has moved to the left, closing the distance between the user 10 and the world-locked content 110A. The apparatus 30 is in the first-person perspective mediated reality state 102.

The apparatus 30 renders world-locked content 110A to the user at a different position compared to FIG. 11A. The apparatus 30 renders world-locked content 110A closer to the user 10 because the user's point of view 12 (physical location 14) has changed, changing the virtual user's point of view 22 (location 24).

The apparatus 30 renders point-of-view-locked content 110B to the user at a same position, relative to the user 10, compared to FIG. 11A.

The apparatus 30 responds to one or more user gestures 80 and enters the spatially consolidated state 104 (FIG. 11O). In the spatially consolidated state 104, the mediated reality content is rendered as content 110 distributed across a second area 122 of the user's field of view. The second area 122 is smaller than the first area used for rendering the mediated reality content 110 in the first-person perspective mediated reality state 102.

Figure 11D:
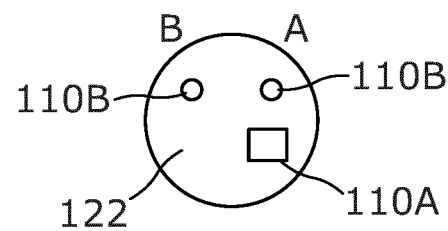

FIG. 11D illustrates the second area 122 of the user's field of view in more detail. The mediated reality content is rendered as content 110 distributed across the second area 122 of the user's field of view. The second area 122 is smaller than the first area used for rendering the mediated reality content 110 in the first-person perspective mediated reality state 102.

In this example, in the spatially consolidated state 104, the world-locked content 110A and the point-of-view-locked content 110B are simultaneously rendered to the user 10.

FIGS. 12A, 12B and 12C illustrate an example of how to determine the arrangement of the world-locked content 110A and the point-of-view-locked content 110B in the second area 122 of the user's field of view.

FIG. 12A illustrates how the world-locked content 110A and the point-of-view-locked content 110B are arranged in the virtual space 21. This corresponds to FIG. 11B.

The apparatus 30 brings the world-locked content 110A and the point-of-view-locked content 110B towards the user so that they are the same distance away from the user 10 in a large-circle constellation (FIG. 12B) and then scales that circle down to place the world-locked content 110A and the point-of-view-locked content 110B within the second area 122, for example as a circle constellation, and moves the second area 122 to be placed at a wrist 130 of the user 10.

In the example of FIGS. 11O and 11D, the apparatus 30 responds to at least a user gesture 80 to enter a spatially consolidated state 104; and in the spatially consolidated state 104, renders mediated reality content as content 110 distributed across a second area 122 of a user's field of view 120, wherein the second area 122 is smaller than the first area 121 and the point of view 12 of the user 10 does not determine the content 110 distributed across the second area 122 of the user's field of view 120. The rendered mediated reality content comprises the world-locked content 110A and the point-of-view-locked content 110B.

However, in other examples, the rendered mediated reality content comprises the world-locked content 110A and does not comprise the point-of-view-locked content 110B. The content that was world-locked can be browsed by re-orientating the wrist 130 of the user to change the point of view 22. In some examples a rotation of the wrist 130 through an angle produces a greater rotation angle for the point of view 22. For example, the world-locked content (360×360 degrees) may be mapped to a smaller turn of the wrist 130 (e.g. 90×90 degrees).

In other examples, the rendered mediated reality content comprises the point-of-view-locked content 110B and does not comprise the world-locked content 110A.

In the foregoing examples, the first area 121 is greater than the second area 122. For example, the first area could subtend a solid angle greater than 60°; if the second area solid angle<x, then the ratio of first area/second area is [tan 60°/tan x°]². In different examples the second area 122 is less than 1/20th, 1/60th or 1/300th of first area 121.

In the foregoing examples, the second area 122 is of a reduced area and is placed at a new location. The second area 122 can be locked to that new location. In some but not necessarily all examples, the new location is a limb of the user. In some but not necessarily all examples, the new location is a wrist of the user. In some but not necessarily all examples, the new location is a position of a wrist-watch on a wrist of the user. In some examples, the second area 122 has a size not greater than a span of the user's hand. In some examples, the second area 122 has a size that can be varied by the user 10.

In the foregoing examples, the second area 122 has been placed at a wrist 130 of the user. However, the second area 122 can be placed at any suitable location within the user's field of view 120. For example, when someone approaches the user 10 can use a gesture to change states and move the mediated reality content to a second area 122 away from the portion of the field of view occupied by or likely to be occupied by the approaching person.

Different gestures 80 can be used for different content types: if the user 10 has a smart watch, the gesture 80 of moving the point-of-view-locked content 110B to a wrist 130 will automatically move the content to the smart watch or wrist 130. The gesture 80 is an approximately vertical gesture done with the hand from the area around the head to the area close to the wrist 130. In case the user wants to move also the world-locked content 110A to the wrist 130 or watch, the user may additionally make a second gesture 80 which is approximately horizontal and done with the arm whose wrist 130 the content should be moved to. For example, the horizontal movement can extend to between 20 and 90 degrees.

Different gestures 80 can be used for selecting different content: in an additional or alternative embodiment, the gesture 80 to move world-locked content 110A to the wrist 130 is done with the other arm with respect to the arm whose wrist 130 the content is to be moved to. The initial direction where the gesture 80 starts indicates which of the world-locked content 110A is to be moved to the wrist. For example, the user may move the hand to a certain direction where there is a world-locked content 110A, keep the hand still for one-two seconds (for example) and then move the hand to the wrist 130 of the other arm.

In an additional embodiment, the user 10 may decide that after the content 110 is moved to the wrist 130 or watch, notifications from that content 110 have to be turned off. To this end, the user uses gestures to push the content 110 "inside" the wrist 130/watch, to indicate that content/notifications have to be silent. If one or more of the contents 110 can have notifications turned on, the user can use gestures to successively "pop out" one or more of the icons representing the contents 110.

In an additional embodiment, if a friend is near the user 10 who is experiencing the point-of-view locked content 110B and the world-locked content 110A, the user 10 may use gestures 80 to move the point-of-view locked content 110B and/or world-locked content 110A to the friend's wrist or watch. This is a way to easily share the mediated reality content with a friend. Furthermore, in one embodiment, the content will stay on the friend's wrist or watch only while the user 10 is near the friend, and when they are no longer near each other the content will disappear from the friend's wrist. In another embodiment, the content 110A, 110B will stay on the friend's wrist or watch even when the two are no longer near each other. The user 10 may also select which of the point-of-view-locked contents 110B are to be shared, by grabbing one or more of the point-of-view locked contents 110B.

In an additional embodiment, if one or more of the contents 110 which are moved to wrist 130 or watch consist of a process with another user or entity (for example an audio or video call with another person or bot), the other user or entity will automatically receive a notification that the user may be temporarily busy or simply that the user 10 has moved the content or app to the wrist.

It will now be appreciated that FIG. 5 illustrates a method (e.g. state machine 100) comprising:
  in a first-person perspective mediated reality state 102, rendering mediated reality content as content distributed across a first area of a user's field of view, wherein a point of view determines a point of view within a three-dimensional virtual space and determines at least part of the content distributed across the first area of a user's field of view as a virtual scene;
  detecting user gestures and responding to a defined user gesture or gestures to enter a spatially consolidated state; and
  in the spatially consolidated state, rendering mediated reality content as content distributed across a second area of a user's field of view, wherein the second area is smaller than the first area and
  the point of view of the user does not determine the content distributed across the second area of a user's field of view.

It will now be appreciated that FIG. 2 illustrates a computer program 48 that when loaded into a processor causes:
  in a first-person perspective mediated reality state, rendering mediated reality content as content distributed across a first area of a user's field of view, wherein a point of view determines a point of view within a three-dimensional virtual space and determines at least part of the content distributed across the first area of a user's field of view as a virtual scene;
  detecting user gestures and responding to a defined user gesture or gestures to enter a spatially consolidated state; and
  in the spatially consolidated state, rendering mediated reality content as content distributed across a second area of a user's field of view, wherein the second area is smaller than the first area and
  the point of view of the user does not determine the content distributed across the second area of a user's field of view.

The methods as described with reference to FIGS. 1 to 12 may be performed by any suitable apparatus (e.g. apparatus 30), computer program (e.g. computer program stored into the memory 46) or system such as those previously described or similar.

Also as an example, an apparatus 30 may comprise: at least one processor 40; and at least one memory 46 including computer program code, the at least one memory 46 and the computer program code configured to, with the at least one processor 40, cause the apparatus 30 at least to perform:
  in a first-person perspective mediated reality state, rendering mediated reality content as content distributed across a first area of a user's field of view, wherein a point of view determines a point of view within a three-dimensional virtual space and determines at least part of the content distributed across the first area of a user's field of view as a virtual scene;
  detecting user gestures and responding to a defined user gesture or gestures to enter a spatially consolidated state; and
  in the spatially consolidated state, rendering mediated reality content as content distributed across a second area of a user's field of view, wherein the second area is smaller than the first area and
  the point of view of the user does not determine the content distributed across the second area of a user's field of view.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

It will be appreciated from the foregoing that the various methods 600 described may be performed by an apparatus 30 for example an electronic apparatus 30.

References to 'computer-readable storage medium', 'computer program product', 'tangibly embodied computer program', 'computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks, steps and processes illustrated in the FIGS. 1-12 may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42, for example be a module. The apparatus may be a module. The rendering devices 32 may be a module or separate modules.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one memory storing instructions that, when executed by the at least one processor, cause the apparatus to perform at least the following:
in a first-person perspective mediated reality state, rendering mediated reality content as content distributed across a first area of a user's field of view, wherein a point of view of a user determines a point of view within a three-dimensional virtual space and determines at least part of the content distributed across the first area of the user's field of view as a virtual scene;
responding to at least one user gesture to enter a spatially consolidated state; and
in the spatially consolidated state, rendering the mediated reality content as content distributed across a second area of a user's field of view, wherein the second area is smaller than the first area and the point of view of the user does not determine the content distributed across the second area of the user's field of view, wherein the mediated reality content comprises a plurality of virtual objects, and wherein locations of the plurality of virtual objects of the content in the second area are dependent upon a three-dimensional projection of the plurality of virtual objects in the three-dimensional virtual space onto a flat two-dimensional plane.

2. An apparatus as claimed in claim 1, wherein the second area of the user's field of view is locked to a user's wrist and moves within the user's field of view as the user's wrist moves within the user's field of view.

3. An apparatus as claimed in claim 1, wherein the locations of virtual objects of the content in the three-dimensional virtual space are projected onto the flat two-dimensional plane to determine the content distributed across the second area.

4. An apparatus as claimed in claim 1, wherein the at least one memory stores instructions that, when executed by the at least one processor, cause the apparatus to perform, in the spatially consolidated state, determining based on at least one user gesture, but not the point of view of the user, a point of view within the three-dimensional virtual space and determine the content distributed across the second area of the user's field of view.

5. An apparatus as claimed in claim 1, wherein:
in the first-person perspective mediated reality state, a point of view determines a sub-set of world-locked content that is distributed across the first area of the user's field of view as a virtual scene but does not determine point-of-view-locked content rendered within the first area of the user's field of view,
in the spatially consolidated state, an orientation of a user's wrist determines a sub-set of world-locked content that is distributed across the second area of the user's field of view but does not determine point-of-view-locked content rendered within the second area of the user's field of view.

6. An apparatus as claimed in claim 5, wherein in the spatially consolidated state, the point-of-view-locked content is rendered within the second area of the user's field of view in response to a user gesture in relation to the user's wrist.

7. An apparatus as claimed in claim 1, wherein the at least one user gesture comprises a movement of a user's hand in three-dimensions.

8. An apparatus as claimed in claim 1, wherein the at least one user gesture is detected using a wrist worn device.

9. An apparatus as claimed in claim 1, wherein the at least one memory stores instructions that, when executed by the at least one processor, cause the apparatus to perform selecting, based on the at least one user gesture, one or more of:
which content is spatially consolidated to the second area;
which rendering device is used to render the second area; or
one or more characteristics of the spatial consolidation to the second area selected from:
size of the second area;
location of the second area; or
shape of the second area.

10. An apparatus as claimed claim 1 where the at least one memory stores instructions that, when executed by the at least one processor, cause the apparatus to perform:
in the first-person perspective mediated reality state, rendering mediated reality content as content distributed across a first area of the user's field of view using a head-mounted display; and
in the spatially consolidated state, rendering mediated reality content as content distributed across a second area of the user's field of view, using the head-mounted display.

11. An apparatus as claimed in claim 10, wherein the second area of the user's field of view is presented as a simulated face of a wrist watch, a shape of the second area changing with a distance and an orientation of a user's wrist to eyes of the user.

12. An apparatus as claimed in claim 1 where the at least one memory stores instructions that, when executed by the at least one processor, cause the apparatus to perform:
in the first-person perspective mediated reality state, rendering mediated reality content as content distributed across a first area of the user's field of view using a head-mounted display; and
in the spatially consolidated state, rendering mediated reality content as content distributed across a second area of the user's field of view, using a wrist worn device.

13. A method comprising:
in a first-person perspective mediated reality state, rendering mediated reality content as content distributed across a first area of a user's field of view, wherein a point of view of a user determines a point of view within a three-dimensional virtual space and determines at least part of the content distributed across the first area of the user's field of view as a virtual scene;
detecting user gestures and responding to a defined user gesture or gestures to enter a spatially consolidated state; and
in the spatially consolidated state, rendering mediated reality content as content distributed across a second area of a user's field of view, wherein the second area is smaller than the first area and the point of view of the user does not determine the content distributed across the second area of the user's field of view, wherein the mediated reality content comprises a plurality of virtual objects, and wherein locations of the plurality of virtual objects of the content in the second area are dependent upon a three-dimensional projection of the plurality of virtual objects in the three-dimensional virtual space onto a flat two-dimensional plane.

14. A method as claimed in claim 13, wherein:
in the first-person perspective mediated reality state, a point of view determines a sub-set of world-locked content that is distributed across the first area of the user's field of view as a virtual scene but does not determine point-of-view-locked content rendered within the first area of the user's field of view,
in the spatially consolidated state, an orientation of a user's wrist determines a sub-set of world-locked content that is distributed across the second area of the user's field of view but does not determine point-of-view-locked content rendered within the second area of the user's field of view.

15. A method as claimed in claim 13, wherein the at least one user gesture comprises a movement of a user's hand in three-dimensions.

16. A method as claimed in claim 13, wherein the at least one user gesture is detected using a wrist worn device.

17. A method as claimed in claim 13, wherein:
in the first-person perspective mediated reality state, rendering mediated reality content as content distributed across a first area of the user's field of view using a head-mounted display; and
in the spatially consolidated state, rendering mediated reality content as content distributed across a second area of the user's field of view, using the head-mounted display.

18. A method as claimed in claim 13, wherein:
in the first-person perspective mediated reality state, rendering mediated reality content as content distributed across a first area of the user's field of view using a head-mounted display; and
in the spatially consolidated state, rendering mediated reality content as content distributed across a second area of the user's field of view, using a wrist worn device.

19. A non-transitory computer readable storage medium encoded with a computer program comprising instructions that when loaded into a processor cause:
in a first-person perspective mediated reality state, rendering mediated reality content as content distributed across a first area of a user's field of view, wherein a point of view of a user determines a point of view within a three-dimensional virtual space and determines at least part of the content distributed across the first area of the user's field of view as a virtual scene;

detecting user gestures and responding to a defined user gesture or gestures to enter a spatially consolidated state; and in the spatially consolidated state, rendering mediated reality content as content distributed across a second area of a user's field of view, wherein the second area is smaller than the first area and the point of view of the user does not determine the content distributed across the second area of the user's field of view, wherein the mediated reality content comprises a plurality of virtual objects, and wherein locations of the plurality of virtual objects of the content in the second area are dependent upon a three-dimensional projection of the plurality of virtual objects in the three-dimensional virtual space onto a flat two-dimensional plane.

* * * * *